(12) United States Patent
Fischer et al.

(10) Patent No.: US 8,430,121 B2
(45) Date of Patent: Apr. 30, 2013

(54) GAS FLOW MONITOR

(75) Inventors: Norbert Fischer, Magdeburg (DE);
Thomas Vogt, Bad Suderode (DE)

(73) Assignee: Mertik Maxitrol GmbH & Co. KG, Thale (DE)

( * ) Notice: Subject to any disclaimer, the term of this patent is extended or adjusted under 35 U.S.C. 154(b) by 492 days.

(21) Appl. No.: 12/529,636

(22) PCT Filed: Feb. 25, 2008

(86) PCT No.: PCT/EP2008/001458
§ 371 (c)(1),
(2), (4) Date: Sep. 2, 2009

(87) PCT Pub. No.: WO2008/107086
PCT Pub. Date: Sep. 12, 2008

(65) Prior Publication Data
US 2010/0012202 A1    Jan. 21, 2010

(30) Foreign Application Priority Data
Mar. 2, 2007  (DE) .......................... 10 2007 010 227

(51) Int. Cl.
*F16K 17/24*  (2006.01)
(52) U.S. Cl.
USPC ........................................................ 137/517
(58) Field of Classification Search ................. 137/498, 137/517, 514.7, 540, 542; 251/118
See application file for complete search history.

(56) References Cited

U.S. PATENT DOCUMENTS

| | | | | |
|---|---|---|---|---|
| 755,996 | A * | 3/1904 | Brune | 137/517 |
| 2,526,346 | A * | 10/1950 | Goldinger | 137/517 |
| 2,647,533 | A * | 8/1953 | Beymer | 137/517 |
| 2,655,934 | A * | 10/1953 | Clair | 137/517 |
| 2,873,760 | A | 2/1959 | Safford | |
| 3,918,481 | A | 11/1975 | Doe et al. | |

(Continued)

FOREIGN PATENT DOCUMENTS

| | | |
|---|---|---|
| DE | 2924533 A1 | 1/1981 |
| DE | 4300432 A1 | 7/1994 |

(Continued)

OTHER PUBLICATIONS

International Search Report for PCT/EP2008/001458 dated Aug. 14, 2008 (four pages).

(Continued)

*Primary Examiner* — Kevin Lee
*Assistant Examiner* — Macade Brown
(74) *Attorney, Agent, or Firm* — Howard & Howard Attorneys PLLC

(57) ABSTRACT

A gas flow monitor is provided, in which a defined range of the closing or nominal flow can be set without engaging functional elements. Furthermore, the original closing or nominal flow can be adjusted or amended, even outside the manufacturing plant. The gas flow monitor consists of a gastight housing (1) which comprises an inner valve seat (5) for a closing member (9) which is displaceable within the housing (1) and is guided in a sleeve (6) in a longitudinally displaceable manner by a pin (7) and is held in the open position against the flow direction by the force of a closing spring (11). The housing (1) is connected on the inlet side to a tubular insert (13), the inner contour (14) of which determines the flow profile up to the valve seat (5).

10 Claims, 2 Drawing Sheets

U.S. PATENT DOCUMENTS

Figure 1:
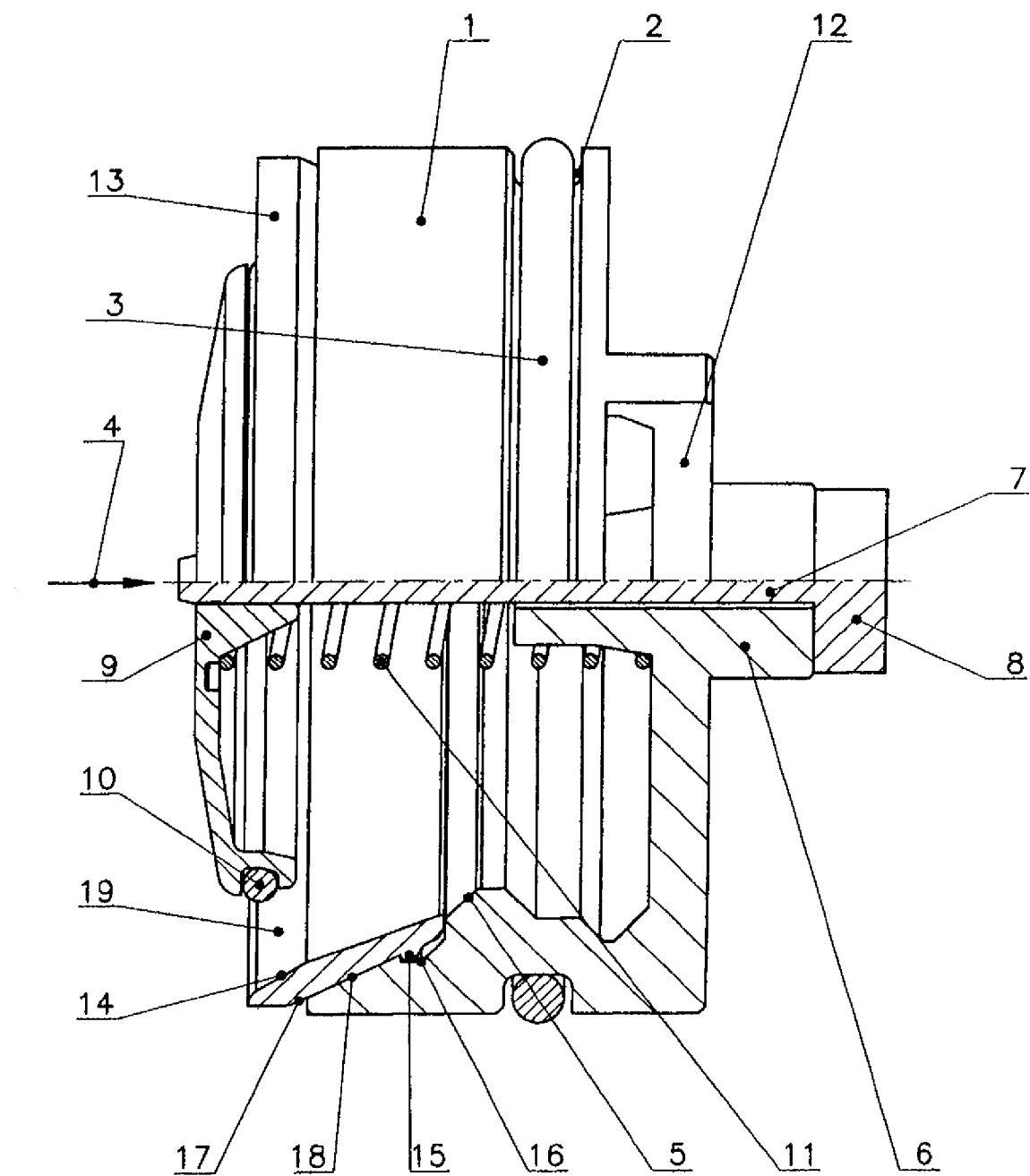

| | | | | |
|---|---|---|---|---|
| 4,609,014 | A | * | 9/1986 | Jurjevic et al. ............... 137/504 |
| 5,105,850 | A | | 4/1992 | Harris |
| 5,755,259 | A | | 5/1998 | Schulze et al. |
| 6,279,175 | B1 | * | 8/2001 | Blaney ............................. 4/287 |
| 6,308,730 | B1 | | 10/2001 | Schulze |
| 2002/0130291 | A1 | | 9/2002 | Geib et al. |
| 2004/0031524 | A1 | | 2/2004 | Schulze |
| 2012/0125455 | A1 | | 5/2012 | Schulze |

FOREIGN PATENT DOCUMENTS

| | | | |
|---|---|---|---|
| DE | 10043811 | A1 | 9/2000 |
| DE | 20116899 | U1 | 10/2001 |
| DE | 10202067 | A1 | 7/2003 |
| DE | 10352372 | A1 | 11/2003 |
| DE | 20317261 | U1 | 11/2003 |
| DE | 202005001685 | U1 | 2/2005 |
| DE | 10340679 | A1 | 3/2005 |
| DE | 102004006664 | A1 | 9/2005 |
| DE | 102005009438 | A1 | 9/2006 |
| DE | 102006028466 | A1 | 12/2007 |
| DE | 102007008285 | A1 | 8/2008 |
| DE | 102007010227 | A1 | 9/2008 |
| EP | 1605193 | A1 | 12/2005 |
| GB | 2247735 | | 3/1992 |
| JP | 03033572 | A | 2/1991 |
| WO | WO 9963254 | A1 | 12/1999 |

OTHER PUBLICATIONS

Machine assisted English translation for DE 2924533 extracted from the espacenet.com database on Aug. 10, 2012, 12 pages.

English language abstract for DE 4300432 extracted from the espacenet.com database on Aug. 10, 2012, 7 pages.

English language abstract and machine assisted translation for DE 102005009438 extracted from the espacenet.com database on Aug. 10, 2012, 20 pages.

English language abstract and machine assisted translation for DE 102006028466 extracted from the espacenet.com database on Aug. 10, 2012, 9 pages.

English language abstract and machine assisted translation for DE 102007008285 extracted from the espacenet.com database on Aug. 10, 2012, 10 pages.

English language abstract for DE 102007010227 extracted from the espacenet.com database on Aug. 10, 2012, 9 pages.

English language abstract for WO 9963254 extracted from the espacenet.com database on Aug. 10, 2012, 22 pages.

* cited by examiner

GAS FLOW MONITOR

CROSS REFERENCE TO RELATED APPLICATION

This application claims priority to and all the advantages of International Application No. PCT/EP2008/001458, filed on Feb. 25, 2008, which claims priority to German Patent Application No. 10 2007 010 227.7, filed on Mar. 2, 2007.

TECHNICAL FIELD

The invention relates to a gas flow monitor for automatically shutting off downstream gas pipes when a defined maximum flow has been exceeded in accordance with the preamble of claim 1.

PRIOR ART

There are a large number of embodiments of gas flow monitors of this type. They are used in pipelines, for example upstream of gas valves, gas appliances, etc. and interrupt the gas supply into the next gas pipe if gas consumption exceeds a predetermined level, as is the case when pipes are cracked or there are inadmissibly high gas leaks for example. In order to set the desired closing or nominal flow when using this gas flow monitor, a spring is biased by changeable stops in such a way that, owing to the resulting force of the biasing force of the spring and the flow force of the gas flow, the gas flow monitor adopts either its closed or open position.

A gas flow monitor of this type is disclosed in DE 100 43 811 A1. It consists of a gas-tight housing which is inserted into a pipeline flowed through by gas. A valve seat for a movable closing element is formed inside the housing. The closing element is fixed on an axially displaceable pin which is mounted in an inlet guide and in an outlet guide. This element is held in the open position by a closing spring which, on the one hand, is supported on an adjustment element screwed centrally into the inlet guide and, on the other hand, is supported on the closing element. In addition, a spacer is arranged on the inlet guide and, in the open position of the gas flow monitor, forms a stop for the closing element which can also be adjusted.

Another embodiment of a gas flow monitor is known from DE 201 16 899 U1. This gas flow monitor also consists of a housing comprising an inner valve seat and a closing element arranged in the housing, which element is held in its open position by a retention force in the normal state. A guide pin is fixed to the closing element, which pin extends from the closing element in the direction opposite the valve seat, through an opening formed in a support element and is thus guided therein. The guide pin comprises annular grooves in its end opposite the closing element. An adjusting ring is locked in one of the annular grooves. A spring is arranged between the adjusting ring and the support element, which spring exerts a compressive force on the adjusting ring. This compressive force forms a retention force which holds the closing element in the open position. By locking the adjusting ring in another annular groove, the compressive force exerted by the spring, and thus the retention force, can be changed.

A similar assembly has a safety valve which is described identically in DE 203 17 261 U1 and in DE 103 52 372 A1. A valve seat for a closing element is arranged in a housing. A retaining bridge is screwed into the housing in the direction of flow upstream of the valve seat. The closing element comprises a guide bolt which is mounted in the retaining bridge so as to be axially displaceable. The retention force is exerted by a pressure spring which surrounds the guide bolt and, on the one hand, is supported on a guide sleeve connected to the retaining bridge and, on the other hand, is supported on a support face of the guide bolt, said force being determined by the position of the guide sleeve relative to the retaining bridge.

Another embodiment known from JP 3-33572 A has a similar construction to the aforementioned safety valve. One difference is that the housing is split into two so as to produce a guide region for the guide bolt on either side of the valve body.

DE 20 2005 001 685 U1 claims an adapter element which can be used with a flow monitor arranged therein in a pipe portion. It is thus possible to implement a specific flow monitor by using various adapter elements in a large number of different pipes.

All these known solutions pose the drawback that setting a specific range of the closing or nominal flow requires engagement of the functional components and this is therefore preferably carried out by the manufacturer of gas flow monitors of this type during the production process. Furthermore, the production process is relatively complex and thus expensive.

DESCRIPTION OF THE INVENTION

The object of the invention is to develop a gas flow monitor of the aforementioned type, in which a defined range of the closing or nominal flow can be set without engaging the functional components. Furthermore, it is possible to adjust or change the original closing or nominal flow, even outside the manufacturing plant, advantageously during installation. The problem is solved in accordance with the invention in that the housing of the gas flow monitor is connected on the inlet side to a tubular insert, the inner contour of which determines the flow profile up to the valve seat.

A solution has thus been found which eliminates the other aforementioned drawbacks of the prior art. By way of the solution according to the invention it is possible to complete the otherwise ready-made and assembled gas flow monitor by way of the insert comprising the relevant inner contour depending on the desired closing or nominal flow. No additional changes to the functional elements are thus required. It is also possible to render the respective embodiment immediately recognisable in a simple manner by colour-coding the different inserts.

Other advantageous embodiments of the invention will emerge from the other claims. It has proven to be particularly favourable if the connection between the housing and the insert is a positive connection, for example via a locking element, so as to prevent changes which may occur with a non-positive connection if there are signs of long-term ageing, for example material fatigue.

In order to be able to easily connect the housing to the insert, the outer face of the insert and the inner face of the housing are configured in such a way that a contour of the locking element is first contacted directly before the locking element is locked.

In order for any subsequent changes to the desired value of the closing or nominal flow to be corrected in a simple manner, it has proven to be particularly advantageous for the connection, for example the lock, between the insert and the housing to be configured in such a way that the insert can be released again, for example by exerting a corresponding force, rotation or the like.

An embodiment has also proven to be advantageous from a manufacturing point of view, in which the housing is integral with the sleeve forming a bearing for the longitudinally displaceable pin which guides the closing element.

A particularly advantageous embodiment of a gas flow monitor with additional improved fatigue strength is the subject-matter of another claim. In this variant, the part of the pin projecting downstream from the sleeve is encased in a cap connected rigidly to the sleeve, a defined annular gap being provided between a collar arranged on the pin and the inner face of the cap in such a way that a restrictor is formed.

EMBODIMENT

Figure 2:
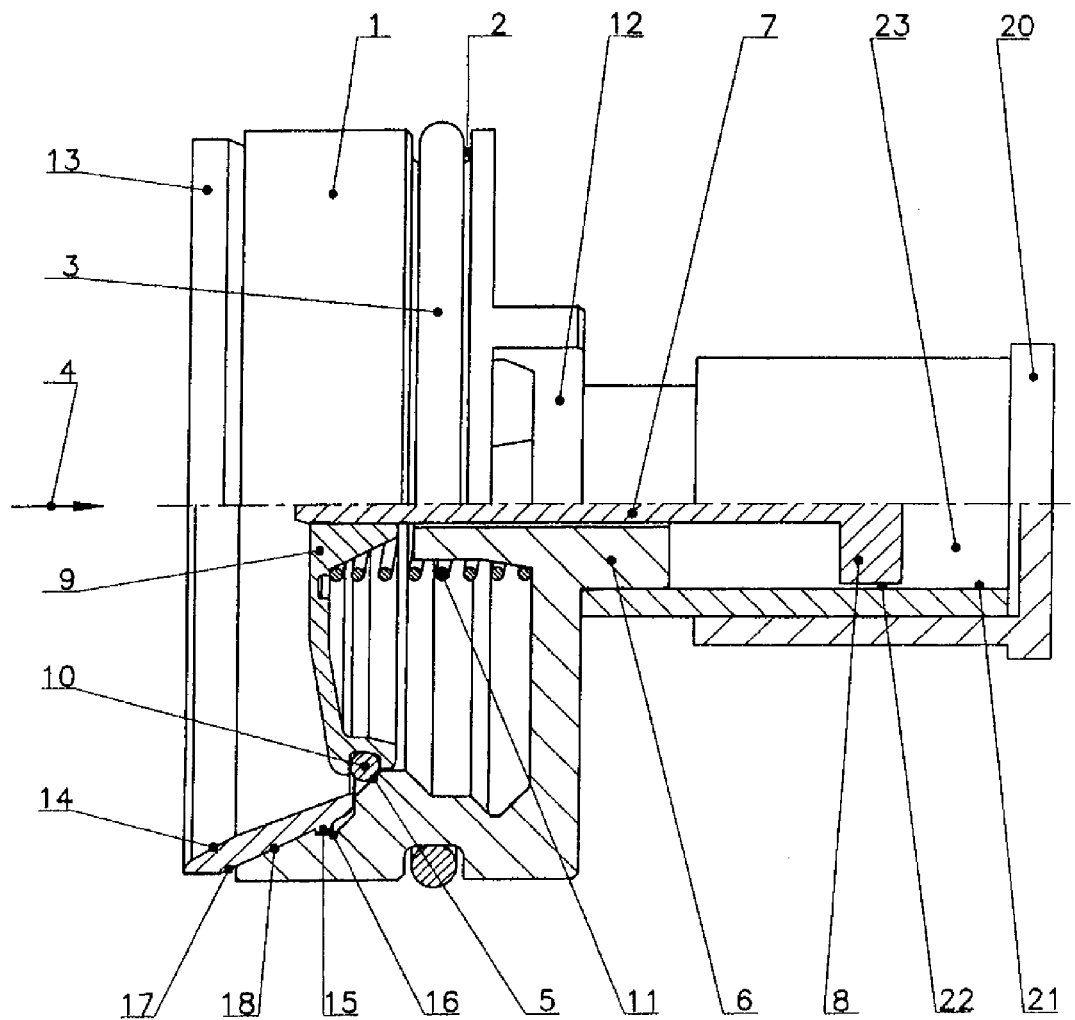

The gas flow monitor according to the invention will now be described in greater detail with reference to an embodiment, in which:

FIG. 1 is a half-section of a gas flow monitor according to the invention in the open position FIG. 2 is a half-section of a gas flow monitor according to the invention with improved fatigue strength and in the closed position The embodiment of a gas flow monitor according to the invention shown in FIG. 1 has a tubular housing 1 which can be pressed into a gas pipe (not shown). In order to ensure the necessary seal between the gas pipe and the housing 1, the housing 1 comprises a peripheral groove 2 in which an O-ring seal 3 is arranged. Another type of connection is, of course, also possible.

A gas may flow through the housing 1 in the direction indicated by a directional arrow 4. The housing 1 is constricted, approximately in its centre, said constriction being formed as a valve seat 5 on its side facing the inlet. An axially arranged sleeve 6 which is connected integrally with the housing 1 via radial webs 12. is arranged at the end of the housing 1 on the outlet side. A pin 7 is guided in the sleeve 6 in a longitudinally displaceable manner and comprises a collar 8 on its end remote from the housing 1. A closing element 9 is fitted on its end penetrating through the constriction in the housing 1, for example by way of an interference fit. In order to achieve the desired seal in the closed position of the gas flow monitor, the closing element 9 has an annular recess for an O-ring seal 10 serving as a resilient sealing element.

A closing spring 11 is supported on the sleeve 6 and holds the closing element 9 in its open position with its other end. The open position is thus defined by the stop of the collar 8 at the sleeve 6.

In order to adjust the closing or nominal flow precisely to the type, nature and amount of consuming devices, a tubular insert 13 is fixed in the inlet region of the housing 1, the inner contour 14 of which insert defines the flow profile up to the valve seat 5. The cross-section of the resulting annular gap 19 is defined by the inner contour 14 in conjunction with the shape of the closing member 9, the size of which cross-section influences the flow velocity of the gas and thus the flow pressure acting on the closing element 9. By way of this influence of the force ratios, the working point of the gas flow monitor is displaced by a relatively large amount depending on the inner contour 14 of the selected insert 13, the closing or nominal flow thus also being changed.

In this embodiment a positive connection is also used in combination with the housing 1. The insert 13 which is preferably made of a plastics material thus has a peripheral bulge 15 on its outer face 17, which bulge is arranged in a peripheral locking groove 16 formed in the inner face 18 of the housing 1 and forms a common locking element together therewith. Of course, the locking element may also be configured in a different manner.

So as to facilitate assembly, the outer face 17 of the insert 13 and the inner face 18 of the housing 1 are configured so as to be conical in such a way that a contour of the locking element is directly contacted before said element is locked. Depending on whether replacement of the insert 13 is to be considered or not, it is also possible to configure the locking element in a conventional manner so the connection may or may not be released, after locking, by way of a corresponding formation of a bulge 15 and/or locking groove 16.

The gas flow monitor described in the first embodiment operates as follows:

The gas flow monitor provided with a insert 13 having any desired inner contour 14 is installed in a gas pipe in such a way that the direction of flow of the gas, as indicated by the directional arrow 4, is maintained. Usually, it is arranged in the position shown in FIG. 1. The closing element 9 is thus held in the open position under the influence of the closing spring 11 acting against the flow. If gas consumption exceeds the closing or nominal flow owing to a damaged downstream gas pipe or a defective downstream consuming device, the flow pressure on the closing element 9 is also increased as a result of the increased flow in the annular gap 19, the force of the closing spring 11 is overcome and the closing element 9 adopts the closed position, as shown in FIG. 2. The gas supply is interrupted.

FIG. 2 also shows an amended embodiment of a gas flow monitor. This gas flow monitor is not sensitive to vibrations. This is necessary when short-term fluctuations of the gas flow above the closing and nominal flow may occur in the gas pipe, for example by gas valves opening suddenly.

In addition to having a construction which is otherwise identical to that shown in FIG. 1 of the gas flow monitor in the open position, the monitor comprises a cap 20 pressed onto the sleeve 6, which cap encases the part of the pin 7 projecting downstream from the sleeve 6. By way of the collar 8 of the pin 7, the hollow space formed by the inner face 21 of the cap 20 is thus split into two regions which are connected via an annular gap 22.

If there is a short-term increase in flow when the gas flow monitor is in the open position, for example caused by the sudden opening of a solenoid valve, said increase exceeding the closing or nominal flow, the gas flow monitor shown in FIG. 1 would also close suddenly. The downstream gas network would thus be disrupted. In contrast, in the case of the gas flow monitor shown in FIG. 2, when the closing element 9 moves the gas must first flow over the annular gap 22 forming a restrictor and from one region into the other. The flow is reduced, which prevents the gas flow monitor from closing suddenly.

LIST OF REFERENCE NUMERALS

1 Housing
2 Groove
3 O-ring seal
4 Directional arrow
5 Valve seat
6 Sleeve
7 Pin
8 Collar
9 Closing element
10 O-ring seal
11 Closing spring
12 Web
13 Insert
14 Inner contour
15 Bulge
16 Locking groove
17 Face
18 Face 19 Annular gap
20 Cap
21 Inner face
22 Annular gap
23 Hollow space

The invention claimed is:

1. A gas flow monitor for automatically shutting off downstream gas pipes when a defined maximum flow is exceeded, said monitor comprising:
   a gas-tight housing (1) having an inlet side and defining an inner valve seat (5),
   a sleeve (6) connected to the housing (1),
   a closing element (9) displaceable within the housing (1),
   said closing element (9) having a pin (7) which guides the closing element (9) and is in turn guided in a longitudinally displaceable manner in the sleeve (6),
   a closing spring (11) supported on the housing (1) and the closing element (9) such that the closing element is held in the open position against a flow direction by the force of the closing spring (11), and
   a tubular insert (13) connected to the inlet side of the housing (1) and defining an inner contour (14) which determines a flow profile up to the valve seat (5), the inner contour (14) including an upstream end and a downstream end and tapering from the upstream end to the downstream end.

2. A gas flow monitor according to claim 1, wherein the connection between the housing (1) and the insert (13) is a positive connection.

3. A gas flow monitor according to claim 2, wherein the insert (13) defines an outer face (17) and the housing (1) defines an inner face (18) and wherein the outer face (17) and the inner face (18) comprise contours which are associated with one another and form locking elements (15, 16).

4. A gas flow monitor according to claim 3, wherein the outer face (17) of the insert (13) and the inner face (18) of the housing (1) are configured in such a way that a contour of a locking element (15, 16) is directly contacted before the locking element (15, 16) is locked.

5. A gas flow monitor according to claim 1, wherein the insert (13) is releasably connected to the housing (1).

6. A gas flow monitor according to claim 1, wherein the housing (1) is formed integrally with the sleeve (6).

7. A gas flow monitor according to claim 1, wherein the pin (7) includes a distal end away from the housing (1) and wherein a collar (8) is disposed on the distal end.

8. A gas flow monitor according to claim 7, wherein a cap (20) having an inner face (21) is rigidly connected to the sleeve (6), the distal end of the pin (7) is encased within the cap (20), and an annular gap (22) is defined between the collar (8) and the inner face (21) of the cap (20).

9. A gas flow monitor according to claim 1, wherein the inner contour (14) of the tubular insert (13) and the closing element (9) define a gap (19) influencing flow velocity of gas through the gas-tight housing (1).

10. A gas flow monitor according to claim 1, wherein the housing (1) defines an inner face (18) that is conical.

* * * * *